United States Patent [19]
Sato et al.

[11] 4,115,747
[45] Sep. 19, 1978

[54] OPTICAL MODULATOR USING A CONTROLLABLE DIFFRACTION GRATING

[76] Inventors: Heihachi Sato, 7-13, Maborikaigan 3-chome; Toda Kohji, 2069C-209, Futaba 1-chome, both of Yokosuka City, Kanagawa, Japan

[21] Appl. No.: 754,580

[22] Filed: Dec. 27, 1976

[51] Int. Cl.² .............................................. H01S 3/10
[52] U.S. Cl. ............................ 331/94.5 M; 332/7.51; 350/162 R; 350/355
[58] Field of Search .................... 331/34.5 C, 94.5 M, 331/94.5 Q; 350/160 R, 161 W; 332/7.51

[56] References Cited

U.S. PATENT DOCUMENTS

| | | | |
|---|---|---|---|
| 3,611,181 | 10/1971 | Lary et al. | 331/94.5 C |
| 3,813,142 | 5/1974 | Buhrer | 350/160 R |
| 3,887,885 | 6/1975 | Hattori et al. | 331/94.5 M |
| 3,997,690 | 12/1976 | Chen | 350/160 R |

OTHER PUBLICATIONS

Brannen et al., Far-Infrared Laser Action Using Compound Grating Fabry-Perot Resonators, IEEE J. Quant. Elect., QE-6, No. 2 (Feb. 1970) pp. 138-139.

*Primary Examiner*—William L. Sikes
*Attorney, Agent, or Firm*—Burgess, Ryan and Wayne

[57] ABSTRACT

The combination of an electro-optic substrate the refractive index of which is changed by an electric field applied to the same and a pair of comb-shaped interdigital diffraction electrodes formed on the surface of said substrate provides an electrically controllable diffraction grating, which can be used as an optical modulator of a laser beam. An example of a substrate is lead-zirconate-titanate ceramic and the electrode can be composed of metal.

3 Claims, 7 Drawing Figures

OPTICAL MODULATOR USING A CONTROLLABLE DIFFRACTION GRATING

BACKGROUND OF THE INVENTION

The present invention relates to an optical modulator using an electrically controllable diffraction grating.

A prior diffraction grating has a glass substrate with a high density of thin, parallel lines on the surface of the same, and is mainly used in the academic spectral analysis field. The characteristics of this diffraction grating are rigidly defined by the size and the period of said lines, and the wavelength of a light beam applied to the diffraction grating, and the characteristics cannot be changed after the diffraction grating is manufactured. Accordingly, the prior diffraction grating has the disadvantage in that its field of use is very limited.

Controllable diffraction gratings which overcome the above diadvantages are shown in (1) "Low Voltage Optical Modulator Using Electro-optically Induced Phase Grating" by T. Motoki, in "Applied Optics", vol. 12, No. 7, 1973, pp 1472 published in U.S.A., and (2) "Nano-second Base-band Optical Diffraction Modulator" by M. G. F. Willson etc. in "Electronics Letters" vol. 7, No. 10, 1971, pp 267 published in England. These prior art gratings are partially controllable, but they have the disadvantage that the substrate on which they are formed must be optically transparent and consequently, the selection of material for the substrate is very limited.

SUMMARY OF THE INVENTION

It is an object, therefore, of the present invention to overcome the disadvantage and limitation of the prior controllable diffraction gratings by providing a new and improved diffraction grating, in which the characteristics can be electrically controlled, and the substrate can be opaque.

The above and other objects are attained by a diffraction grating having an electro-optic substrate whose refractive index changes according to the electric field applied to the same, said change being effected by a pair of comb-shaped diffraction electrodes formed on the surface of said substrate. The material of said substrate may be, for instance, lead-zirconate-titanate.

BRIEF DESCRIPTION OF THE DRAWINGS

The foregoing and other objects, features and attendant advantages of the present invention will be appreciated as the same become better understood by means of the following description and accompanying drawings wherein.

PREFERRED EMBODIMENTS OF THE PRESENT INVENTION

Figure 1:
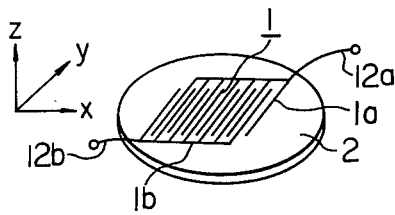
FIG. 1 shows the structure of the diffraction grating according to the present invention.
Figure 2:
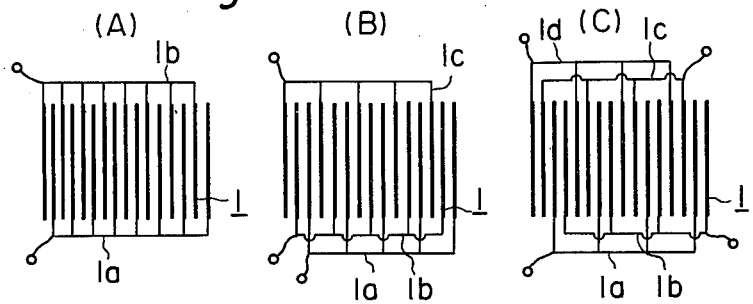
FIGS. 2(A) through 2(C) are three examples of the structure of the diffraction electrodes of the present diffraction grating.

FIG. 1 shows the structure of the present diffraction grating, in which the reference numeral 1 is an interdigital diffraction electrode, 2 is an electro-optic substrate, and 12a and 12b are terminals for applying an electrical signal to the electrode 1. Substrate 2 is characterized by the fact that its refractive index is determined by the strength of the electric field applied thereto. The diffraction electrode 1 has a plurality of thin lines 1a and 1b which form a shape somewhat similar to a comb. The distance between each line 1a and 1b is very small but said pair of electrodes are not electrically connected to each other. The electrodes 1a and 1b are connected to the terminals 12a and 12b, respectively. Some modifications of the electrode 1 are possible as shown in FIGS. 2(A), 2(B) and 2(C). The electrode in FIG. 2(A) is the same as that in FIG. 1, and has two sets of fingers 1a and 1b. The electrode of 2(A) is applied to a single phase input signal. The electrode in FIG. 2(B) has three sets of fingers 1a, 1b and 1c, and is applied to a three phase input signal. The electrode in FIG. 2(C) has four sets of fingers 1a, 1b, 1c and 1d, and is applied to a four phase input signal.

Figure 3:
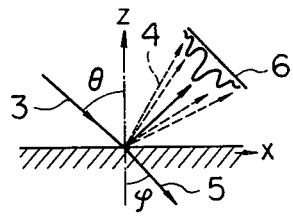
FIG. 3 is an explanatory drawing of the operation of the present invention.

FIG. 3 shows the operation of the present diffraction grating in which reference numeral 3 is an input beam with an incident angle $\theta$, 4 is a reflected beam, 5 is a transmitted or penetrating beam at an angle $\phi$ and 6 is a diffraction pattern. When a linearly polarized light beam whose direction of polarization is parallel to the plane of incidence, i.e., $xz$ plane in FIG. 1, is incident on the surface along the same plane as above, the reflected light beam is diffracted according to the reflectance pattern on the surface of the substrate. Since the difference in the reflectance between the electrode fingers and gaps introduces spatially periodic reflectance pattern, the reflected beam can be expressed in the form of the Fourier transform of the reflectance pattern on the surface. If an electric voltage is applied between these electrode fingers, a periodic variation of the electric field induces a change of this periodic reflectance pattern. The use of the electro-optic material allows the reflectance pattern to be changed since the refractive index of the substrate material between electrodes changes with the applied electric field. Consequently, we can change the diffraction pattern with the voltage applied to the interdigital electrode due to the variation of the reflectance with changes in said voltage.

Figure 4:
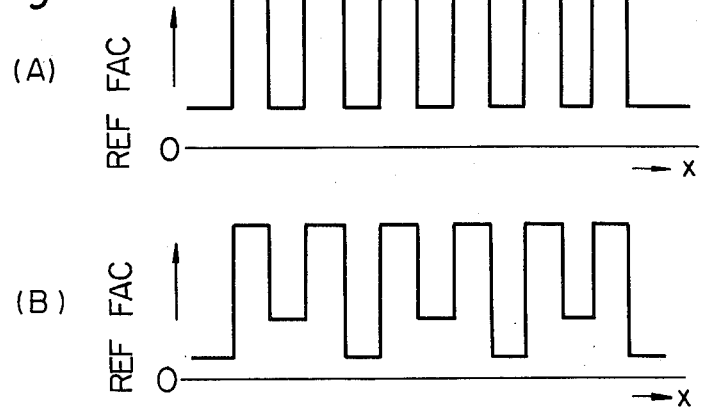
FIGS. 4(A) and 4(B) show the explanatory reflection pattern.

FIGS. 4(A) and 4(B) show the pattern of the reflection factor of the present diffraction grating. In these figures, the horizontal axis shows the X-coordinate and the vertical axis shows the reflection factor. When no voltage is applied to the diffraction electrode, the reflection factor changes regularly as shown in FIG. 4(A). On the other hand, when a single phase input voltage is applied to the diffraction electrode, the reflection factor changes irregularly as shown in FIG. 4(B). Accordingly, it should be noted that the input voltage can modulate the diffraction pattern of the diffraction grating. Also, it should be noted that a transparent substrate provides diffraction to the penetrating beam, depending upon the input voltage. When a three phase or four phase input voltage is applied to the diffraction electrode of FIG. 2(B) or FIG. 2(C), respectively, other diffraction patterns can be obtained.

Figure 5:
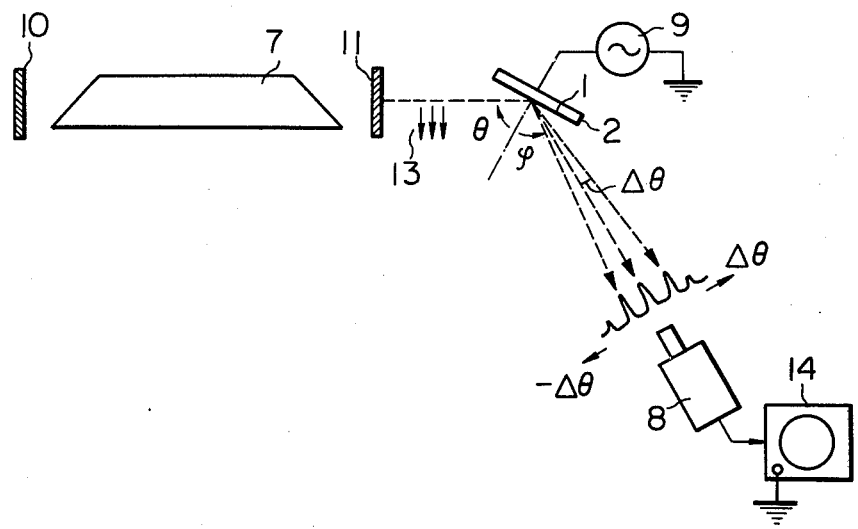
FIG. 5 is an experimental system for observing the diffraction pattern.
Figure 7:
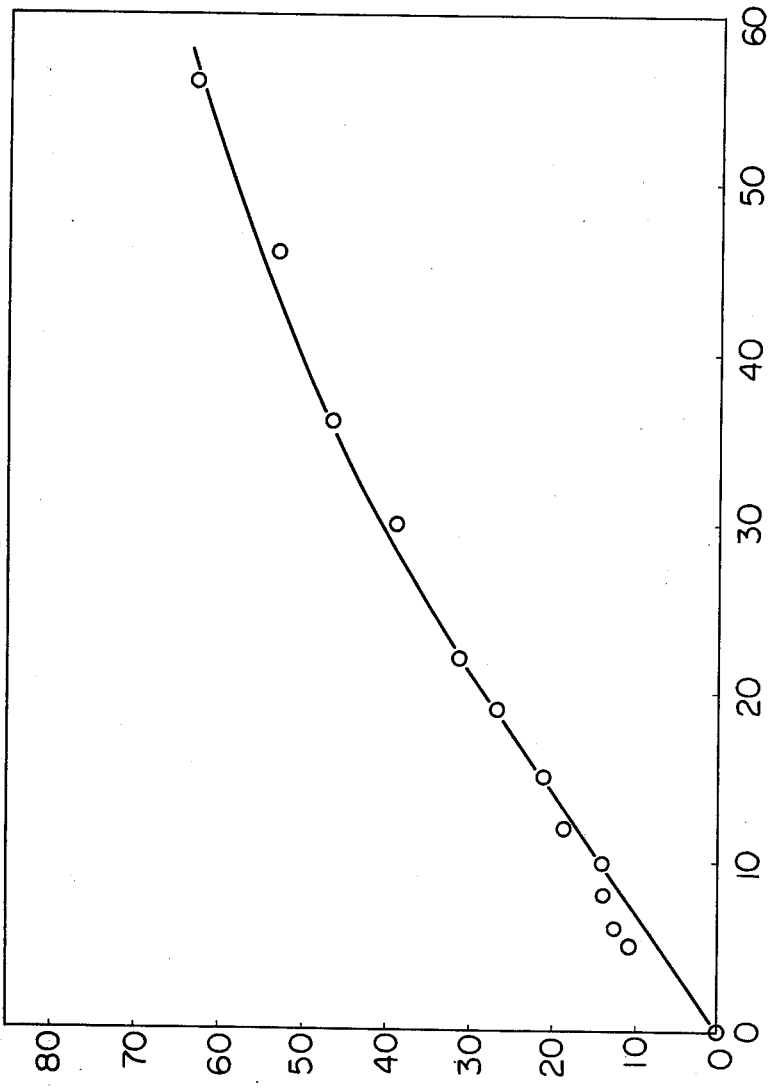
FIG. 7 shows a curve showing the experimental result of the optical modulator.

FIG. 5 shows the experimental system for observing the diffraction pattern of a laser beam. In FIGS. 5, 7 is a laser, 8 is a photo-detector, 9 is an exciter for applying an input voltage to the diffraction grating (1,2), 10 is a resonator mirror, 11 is a semi-transparent mirror, 13 shows the direction of linear polarization, and 14 is an oscilloscope or a recorder. The strength of the diffracted beam and the diffraction angle can be observed in the oscilloscope 14 by sliding the photodetector 8 in a horizontal direction. Also, the diffraction when an input voltage is applied, can be observed.

Figure 6:
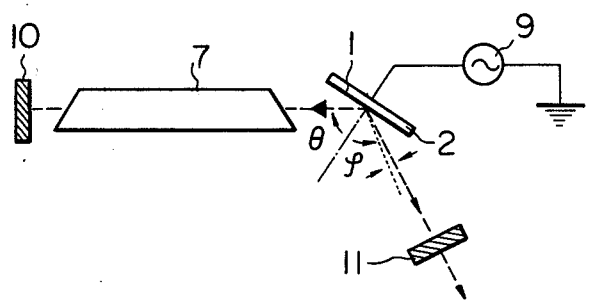
FIG. 6 is an experimental system block-diagram of an optical modulator using the present diffraction grating.

FIG. 6 shows an internal modulation system for a laser.

The present diffraction grating (1, 2) is positioned in a laser resonator at the angle of incidence $\theta$ and the resonator mirror 10 is adjusted so as to maximize the change of beam strength due to the application of an input voltage. When the exciter 9 applies a high frequency modulation signal to the diffraction electrode, the Q-factor of the resonator is changed, and therefore, the output of the laser 7 is changed and modulated by the high frequency modulation signal.

Some of the possible applications of the present invention are; (1) a diffraction grating for academic measurement, (2) a laser modulator for communication purposes, (3) a Q-switch for the generation of a giant pulse by switching the Q-factors by an external voltage, (4) a forced mode locker for obtaining a pulse signal from a continuous wave (CW) laser by applying a signal of axial mode frequency C/2L (C is velocity of light, L is the length between each resonators), (5) a narrow pulse generator, (6) a photo-directional coupler, and (7) a polarization device.

The material of the substrate 2 must have a large primary or secondary electro-optic effect (the effect that the refractive index depends upon the electric field). In a primary electro-optic effect, the refractive index changes linearly in proportion to the change of the electric field, and in a secondary electro-optic effect, the change of the refractive index is proportional to the square of the change of the electric field. Some of the possible materials for the substrate are: Lead-Zirconate-Titanate (PZT), Lanthanum-modified-Lead-Zirconate-Titanate (PLZT), Lithium-Niobate ($L_iN_bO_3$), Lithium-Tantalate ($L_iT_aO_3$), Barium-Titanate ($B_aT_iO_3$), and Strontium-Barium-Niobate (SBN). It should be noted that although the first material (PZT) is not transparent but is opaque, that material can be used in the present invention, which utilizes a reflection type diffraction grating. The material of the diffraction electrode also includes metals such as gold, silver and aluminum.

Some experimental results will be shown below.

EXAMPLE 1

Using the experimental device in FIG. 5, the curve showing the relationship between the voltage applied to the diffraction electrode and the modulation degree was measured, and the result is shown in FIG. 7, in which the horizontal axis shows the peak voltage applied to the diffraction electrode and the vertical axis shows the modulation degree (%). The conditions of the above experiment are as follows:

(a) The period of the electrode structure; 400 $\mu$m
(b) The width and gap of each finger of the electrode; 100 $\mu$m
(c) The substrate material; Lead-Zirconate-Titanate (PZT)

The physical properties of this material are shown in Table 1.

(d) An optical source; a He - Ne 0.63$\mu$m laser with Brewster angle windows.
(e) The incident angle of $\theta$; $\theta = 60°$
(f) The distance between the diffraction grating and the coupling mirror; 5 cm
(g) The frequency of the input signal; 24 KHZ (single phase)
(h) The diffraction angle $\Delta\theta$; $\Delta\theta = \pm 0.013°$ Table 1

| Physical properties of 72-A piezoelectric ceramic* of the PZT family | |
|---|---|
| Dielectric permittivity | $\epsilon_{33}^T = 1700$ |
| Electromechanical coupling factors | $k_p = 0.66, k_t = 0.54,$ $k_{33} = 0.70, k_{31} = 0.36$ |
| Piezoelectric constants | $d_{31} = -200 \times 10^{-12}$ m/V, $d_{33} = 450 \times 10^{-12}$ m/V, $g_{31} = -14 \times 10^{-12}$ Vm/N, $g_{33} = 27 \times 10^{-12}$ Vm/V |
| Dielectric loss factor | $\tan \delta = 1.5 \%$ |
| Mechanical O | 80 |
| Frequency constants | $f_r \cdot 1 = 141$ kHz-cm, $f_4 \cdot t = 116$ kHz-cm |
| Density | $7.50 \times 10^3$ kg/m$^3$ |
| Curie temperature | 314° C |

* : Commercial name, TDK Electronics Co. Ltd. ( Address; 14-6, 2-Chome, Uchikanda, Chiyoda-ku, Tokyo, Japan 101 ).
$f_r \cdot 1$ : frequency constant of a thin bar with electric field perpendicular to length.
$f_r \cdot t$ : frequency constant of a thin plate with electric field parallel to thickness.

EXAMPLE 2

Using a He - Ne 3.39 $\mu$m laser in which the length between the resonator mirrors is 5 m, a pulse train in which the frequency is 30 MHZ and the width of each pulse is 10 ns was obtained.

Finally, it should be noted that opaque electro-optic material can be used as a substrate in the present invention when the present invention is applied to a reflection type diffraction grating, and the present invention has wide application in photo-inegrated circuits which are of significant current interest.

From the foregoing, it will now be apparent that a new and improved optical modulator has been provided. It should be understood of course that the embodiments disclosed are merely illustrative and are not intended to limit the scope of the invention. Reference should be made to the appended claims, therefore rather than the specification as indicating the scope of the invention.

What is claimed is:

1. A controllable diffraction grating comprising an optically opaque electro-optic substrate having the property that the refractive index of the substrate depends upon the electric field applied to said substrate, an interdigital diffraction electrode mounted on a major surface of said substrate, said electrode having a plurality of pairs of adjacent parallel fingers, a plurality of terminals connected to each member of said pairs of fingers, said surface of the substrate being capable of diffracting a light beam impinging thereon from a direction perpendicular to the fingers and reflecting the diffracted light beam, the diffraction of the reflected light beam being dependent upon the electric potential applied to said interdigital diffraction electrode via said terminals.

2. The diffraction grating defined in claim 1, wherein the main component of the material of said optically opaque substrate is Lead-Zirconate-Titanate.

3. A laser modulator comprising a controllable diffraction grating having an opaque electro-optic substrate made of Lead-Zirconate-Titanate and an interdigital diffraction electrode formed on the surface of said substrate with terminals thereto, a resonator mirror, a laser source positioned between said mirror and said diffraction grating to direct a laser beam to said surface from a direction perpendicular to the fingers of said electrode, a semitransparent mirror positioned to receive a beam reflected and diffracted by said grating, and a signal source for providing a modulation signal to said grating.

* * * * *

UNITED STATES PATENT OFFICE
CERTIFICATE OF CORRECTION

Patent No. 4,115,747　　　　　　　　　　Dated September 19, 1978

Inventor(s) Heihachi Sato, et al.

It is certified that error appears in the above-identified patent and that said Letters Patent are hereby corrected as shown below:

Column 4, line 19, "$f_4 \cdot t$" should read -- $f_r \cdot t$ --.

Signed and Sealed this

Tenth Day of April 1979

[SEAL]

Attest:

RUTH C. MASON
*Attesting Officer*

DONALD W. BANNER
*Commissioner of Patents and Trademarks*